(12) United States Patent
Zhamu et al.

(10) Patent No.: US 10,673,063 B2
(45) Date of Patent: Jun. 2, 2020

(54) PROCESS FOR PRELITHIATING AN ANODE ACTIVE MATERIAL FOR A LITHIUM BATTERY

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 51 days.

(21) Appl. No.: 15/710,952

(22) Filed: Sep. 21, 2017

(65) Prior Publication Data

US 2019/0088922 A1    Mar. 21, 2019

(51) Int. Cl.
*H01M 4/04*    (2006.01)
*H01M 4/36*    (2006.01)
(Continued)

(52) U.S. Cl.
CPC ............. *H01M 4/049* (2013.01); *C01B 33/00* (2013.01); *C01D 13/00* (2013.01); *C01D 15/00* (2013.01); *C01G 19/00* (2013.01); *C01G 19/02* (2013.01); *C01G 51/04* (2013.01); *C01G 51/42* (2013.01); *H01M 4/0471* (2013.01); *H01M 4/131* (2013.01); *H01M 4/134* (2013.01); *H01M 4/366* (2013.01); *H01M 4/622* (2013.01); *C01P 2004/12* (2013.01); *C01P 2004/16* (2013.01); *C01P 2004/17* (2013.01);
(Continued)

(58) Field of Classification Search
None
See application file for complete search history.

(56) References Cited

U.S. PATENT DOCUMENTS

| | | | |
|---|---|---|---|
| 4,804,594 A | 2/1989 | Jow et al. | |
| 4,980,250 A | 12/1990 | Takahashi et al. | |

(Continued)

FOREIGN PATENT DOCUMENTS

| | | | |
|---|---|---|---|
| JP | 4815063 B2 | 11/2011 | |
| KR | 20140062202 A | 5/2014 | |

(Continued)

OTHER PUBLICATIONS

PCT/US18/42204 International Search Report and Written Opinion dated Oct. 3, 2018, 8 pages.

(Continued)

*Primary Examiner* — Sin J Lee

(57) ABSTRACT

Provided is a process for producing prelithiated particles of an anode active material for a lithium battery. The process comprises: (a) providing a lithiating chamber having at least one inlet and at least one outlet; (b) feeding a plurality of particles of an anode active material, lithium metal particles, and an electrolyte solution (containing a lithium salt dissolved in a liquid solvent) into the lithiating chamber through at least one inlet, concurrently or sequentially, to form a reacting mixture; (c) moving this reacting mixture toward the outlet at a rate sufficient for inserting a desired amount of lithium into the anode active material particles to form a slurry of prelithiated particles dispersed in the electrolyte solution; and (d) discharging the slurry out of the lithiating chamber through the at least one outlet.

26 Claims, 5 Drawing Sheets

(51) Int. Cl.
  *H01M 4/62*   (2006.01)
  *H01M 4/131*  (2010.01)
  *H01M 4/134*  (2010.01)
  *H01M 4/02*   (2006.01)
  *C01D 13/00*  (2006.01)
  *C01D 15/00*  (2006.01)
  *C01G 51/00*  (2006.01)
  *C01G 51/04*  (2006.01)
  *C01G 9/00*   (2006.01)
  *C01G 9/02*   (2006.01)
  *C01B 33/00*  (2006.01)
  *C01G 19/00*  (2006.01)
  *C01G 19/02*  (2006.01)

(52) U.S. Cl.
  CPC ...... *C01P 2004/24* (2013.01); *C01P 2004/61* (2013.01); *C01P 2004/62* (2013.01); *C01P 2004/64* (2013.01); *H01M 2004/027* (2013.01)

(56) References Cited

U.S. PATENT DOCUMENTS

| | | | |
|---|---|---|---|
| 5,436,093 | A | 7/1995 | Huang et al. |
| 5,601,951 | A | 2/1997 | Johnson et al. |
| 5,635,151 | A | 6/1997 | Zhang et al. |
| 6,025,093 | A | 2/2000 | Herr |
| 6,335,115 | B1 | 1/2002 | Meissner |
| 6,706,447 | B2 | 3/2004 | Gao et al. |
| 7,094,499 | B1 | 8/2006 | Hung |
| 7,276,314 | B2 | 10/2007 | Gao et al. |
| 8,158,282 | B2 | 4/2012 | Zhamu et al. |
| 8,241,793 | B2 | 8/2012 | Zhamu et al. |
| 2005/0098914 | A1 | 5/2005 | Varma et al. |
| 2005/0130043 | A1 | 6/2005 | Gao et al. |
| 2005/0266304 | A1 | 12/2005 | Honda et al. |
| 2006/0029864 | A1 | 2/2006 | Matsumoto et al. |
| 2006/0147799 | A1 | 7/2006 | Hayashi et al. |
| 2006/0238203 | A1 | 10/2006 | Kelley et al. |
| 2007/0204457 | A1 | 9/2007 | Sato et al. |
| 2008/0090150 | A1 | 4/2008 | Nakura |
| 2010/0173198 | A1* | 7/2010 | Zhamu ............... H01M 4/134 429/222 |
| 2012/0196186 | A1 | 8/2012 | Richard |
| 2012/0202112 | A1 | 8/2012 | Yushin et al. |
| 2013/0224603 | A1 | 8/2013 | Chen et al. |
| 2014/0170485 | A1 | 6/2014 | Lee et al. |
| 2014/0186716 | A1 | 7/2014 | Wu et al. |
| 2014/0287295 | A1 | 9/2014 | Honda et al. |
| 2015/0300956 | A1 | 10/2015 | Fujieda et al. |
| 2015/0318530 | A1 | 11/2015 | Yushin et al. |
| 2016/0043384 | A1 | 2/2016 | Zhamu et al. |
| 2016/0093884 | A1 | 3/2016 | Cui et al. |
| 2016/0118652 | A1 | 4/2016 | Wu et al. |
| 2016/0126543 | A1* | 5/2016 | Ota ...................... H01M 4/049 429/231.95 |
| 2017/0194663 | A1 | 7/2017 | Zhamu et al. |
| 2018/0241032 | A1* | 8/2018 | Pan ...................... H01M 4/366 |

FOREIGN PATENT DOCUMENTS

| | | |
|---|---|---|
| WO | 2016012275 A1 | 1/2016 |
| WO | 2017123443 A1 | 7/2017 |

OTHER PUBLICATIONS

Umeno et al. "Novel Anode Material for Lithium-Ion Batteries: Carbon-coated Silicon Prepared by Thermal Vapor Decomposition" Chemistry Letters (2001) pp. 1186-1187.

Umeno et al. "Novel Anode Material for Lithium-Ion Batteries: Carbon-coated Silicon Prepared by Thermal Vapor Decomposition" Chemistry Letters (2001) vol. 30, No. 11, pp. 1186-1187.

PCT/US18/42205 International Search Report and Written Opinion dated Oct. 16, 2018, 9 pages.

PCT/US18/51278 International Search Report and Written Opinion dated Jan. 11, 2019, 11 pages.

PCT/US18/51279 International Search Report and Written Opinion dated Jan. 16, 2019, 9 pages.

U.S. Appl. No. 15/665,606 Nonfinal Office Action dated Jan. 10, 2019, 5 pages.

"Polyvinylidene Fluoride (PVDF)", Porex Corporation, date unknown https://www.porex.com/technologies/materials/ porous-plastics/ polyvinylidene-fluoride/[Feb. 19, 2019 2:36:or PM].

JP 48-015063B, English language translation from J-Plat Pat, May 11, 1973.

KR 10-2014-0062202, English language translation, dated May 23, 2014.

U.S. Appl. No. 15/665,606 Nonfinal Office Action dated Jul. 25, 2019, 8 pages.

U.S. Appl. No. 15/665,608 Final Office Action dated Jul. 29, 2019, 8 pages.

U.S. Appl. No. 15/665,608 Nonfinal Office Action dated Feb. 26, 2019.

* cited by examiner

PROCESS FOR PRELITHIATING AN ANODE ACTIVE MATERIAL FOR A LITHIUM BATTERY

FIELD OF THE INVENTION

The present invention provides a process for producing prelithiated particles of an anode active material and an anode electrode for a secondary lithium-ion or lithium metal battery.

BACKGROUND

Concerns over the safety of earlier lithium secondary batteries (using lithium metal as the anode active material) led to the development of lithium-ion batteries, in which pure lithium metal sheet or film was replaced by a carbonaceous material as the negative electrode (anode). The carbonaceous material may comprise primarily graphite that is intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g.

In addition to carbon- or graphite-based anode materials, other inorganic materials that have been evaluated for potential anode applications include metal oxides, metal nitrides, metal sulfides, and a range of metals, metal alloys, and intermetallic compounds that can accommodate lithium atoms/ions. In particular, lithium alloys having a composition formula of $Li_aA$ (A is a metal such as Al, and "a" satisfies 0<a<5) has been investigated as potential anode materials. This class of anode active materials has a higher theoretical capacity, e.g., $Li_4Si$ (maximum capacity=3,829 mAh/g), $Li_{4.4}Si$ (maximum capacity of Si=4,200 mAh/g), $Li_{4.4}Ge$ (maximum capacity of Ge=1,623 mAh/g), $Li_{4.4}Sn$ (maximum capacity of Sn=993 mAh/g), $Li_3Cd$ (maximum capacity of Cd=715 mAh/g), $Li_3Sb$ (maximum capacity of Sb=660 mAh/g), $Li_{4.4}Pb$ (569 mAh/g), LiZn (410 mAh/g), and $Li_3Bi$ (385 mAh/g).

An anode active material is normally used in a powder form, which is mixed with a conductive additive and bonded by a binder resin. The binder also serves to bond the mixture to a current collector. Alternatively, an anode active material may be coated as a thin film onto a current collector. On repeated charge and discharge operations, the alloy particles tend to undergo pulverization and the current collector-supported thin films are prone to fragmentation due to expansion and contraction of the anode active material during the insertion and extraction of lithium ions. This pulverization or fragmentation results in loss of particle-to-particle contacts between the active material and the conductive additive or loss of contacts between the anode material and its current collector. These adverse effects result in a significantly shortened charge-discharge cycle life.

To overcome the problems associated with such mechanical degradation, several approaches have been proposed, including (a) using nano-scaled particles of an anode active material, (b) composites composed of small electrochemically active particles supported by less active or non-active matrices or coatings, and (c) metal alloying. Examples of more promising active particles are Si, Sn, and $SnO_2$. For instance, Umeno, et al. ["Novel Anode Material for Lithium-Ion Batteries: Carbon-coated Silicon Prepared by Thermal Vapor Decomposition," Chemistry Letters, (2001) pp. 1186-1187] proposed an anode based on carbon-coated silicon prepared by thermal vapor decomposition. Although a specific capacity as high as 800-1,450 mAh/g was achieved, the capacity faded rapidly after 40 cycles. Hung [C. C. Hung, "Carbon Materials Metal/Metal Oxide Nanoparticle Composite and Battery Anode Composed of the Same, U.S. Pat. No. 7,094,499 (Aug. 22, 2006)] disclosed a method of forming a composite anode material. The steps include selecting a carbon material as a constituent part of the composite, chemically treating the selected carbon material to receive nanoparticles, incorporating nanoparticles into the chemically treated carbon material, and removing surface nanoparticles from an outside surface of the carbon material with incorporated nanoparticles. A material making up the nanoparticles alloys with lithium. The resulting carbon/nanoparticle composite anodes did not exhibit any significant increase in capacity, mostly lower than 400 mAh/g. In fact, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction cycles, and some undesirable side effects.

The positive electrode (cathode) active material of a lithium-ion battery is typically selected from a broad array of lithium-containing or lithium-accommodating oxides, such as lithium manganese dioxide, lithium manganese composite oxide, lithium nickel oxide, lithium cobalt oxide, lithium nickel cobalt oxide, lithium vanadium oxide, and lithium iron phosphate. These prior art materials do not offer a high lithium insertion capacity and this capacity also tends to decay rapidly upon repeated charging and discharging. A practical specific capacity of a cathode material has been, at the most, up to 200 mAh/g of the cathode active material, which rapidly decays as the charge-discharge cycling operation proceeds. Since the cathode specific capacity is relatively low, there is a strong desire to make use of a cathode active material to its full capacity.

As a lithium-ion cell is charged and discharged, lithium is alternately stored in the cathode and in the anode, so that the total amount of cyclable charge corresponds to the amount of lithium shuttling back and forth between the two electrodes. When the cell is assembled, usually the cathode active material is made to store the amount of lithium available for the subsequent cyclic operation. This selection of cathode, instead of anode, to pre-store the needed lithium was mainly due to the notion that cathode active materials, such as lithium cobalt oxide, are relatively stable in ambient air (e.g., against oxidation) compared to lithiated graphite. However, the notion that this amount of lithium dictating the battery capacity is totally supplied from the cathode, limits the choice of cathode active materials because the active materials must contain removable lithium. Such a requirement prevents the use of other types of possibly higher-capacity cathode active materials; e.g. lithium-free chalcogen compounds, such as titanium disulfate and molybdenum disulfate, and transition metal fluoride, such as $FeF_3$. Also, delithiated products corresponding to $LiCoO_2$ and $LiNiO_2$ formed during charging (e.g. $Li_xCoO_2$ and $Li_xNiO_2$ where 0.4<x<1.0) and overcharging (i.e. $Li_xCoO_2$ and $Li_xNiO_2$ where x<0.4) are not stable. In particular, these delithiated products tend to react with the electrolyte and generate heat, which raises safety concerns. Thus, it would be advantageous to have a high capacity anode active material that pre-stores a high amount of lithium, instead of or in addition to a lithiated cathode active material for use in a lithium battery.

When the lithium-ion cell is assembled and filled with electrolyte, the anode and cathode active materials have a difference in potential of at most about 2 volts between each other. The difference in potential between the two electrodes, after the lithium-ion cell has been charged, is about 4 volts. When the lithium-ion cell is charged for the first time, lithium is extracted from the cathode and introduced into the anode. As a result, the anode potential is lowered significantly (toward the potential of metallic lithium), and the cathode potential is further increased (to become even more positive). These changes in potential may give rise to parasitic reactions on both electrodes, but more severely on the anode. For example, a decomposition product known as solid electrolyte interface (SEI) readily forms on the surfaces of carbon anodes, wherein the SEI layer comprises lithium and electrolyte components. These surface layers or covering layers are lithium-ion conductors which establish an ionic connection between the anode and the electrolyte and prevent the reactions from proceeding any further.

Formation of this SEI layer is therefore necessary for the stability of the half-cell system comprising the anode and the electrolyte. However, as the SEI layer is formed, a portion of the lithium introduced into the cells via the cathode is irreversibly bound and thus removed from cyclic operation, i.e. from the capacity available to the user. This means that, during the course of the first discharge, not as much lithium moves from the anode back to the cathode as had previously been released to the anode during the first charging operation. This phenomenon is called irreversible capacity and is known to consume about 10% to 30% of the capacity of a lithium ion cell.

A further drawback is that the formation of the SEI layer on the anode after the first charging operation may be incomplete and will continue to progress during the subsequent charging and discharge cycles. Even though this process becomes less pronounced with an increasing number of repeated charging and discharge cycles, it still causes continuous abstraction, from the system, of lithium which is no longer available for cyclic operation and thus for the capacity of the cell. Additionally, as indicated earlier, the formation of a solid-electrolyte interface layer consumes about 10% to 30% of the amount of lithium originally stored at the cathode, which is already low in capacity (typically <200 mAh/g). Clearly, it would be a significant advantage if the cells do not require the cathode to supply the required amount of lithium.

Takahashi, et al. ["Secondary Battery," U.S. Pat. No. 4,980,250, Dec. 25, 1990], disclosed methods by means of which lithium is introduced into the anode active material in order to minimize the lithium consumption and thus the irreversible capacity loss. However, prelithiated carbon- or graphite-based anode active materials lead to electrodes which can be handled only under non-oxidizing and dry conditions, making practical production of lithium ion batteries difficult.

Meissner [E. Meissner, "Secondary Lithium-ion Cell with an Auxiliary Electrode," U.S. Pat. No. 6,335,115 (Jan. 1, 2002)] disclosed a secondary lithium-ion cell which includes a lithium-intercalating, carbon-containing anode, a non-aqueous lithium ion-conducting electrolyte, and a lithium-intercalating cathode including a lithium-containing chalcogen compound of a transition metal, and a lithium-containing auxiliary electrode disposed in the cell to compensate for the irreversible capacity loss in the secondary lithium-ion cell. This auxiliary electrode is spatially separated from the electrolyte when the cell is positioned in a first orientation and contacts the electrolyte when the cell is oriented in a second position, for supplying additional lithium to the cell. Such an additional electrode makes the battery very complicated and difficult to make. Switching between two orientations is not a good strategy since it would complicate the handling of the battery and an average consumer would not pay attention to such a detail to ensure proper operation of such a battery.

The approach of using a sacrificial electrode, in addition to an anode and a cathode in a cell, was also proposed earlier by Johnson, et al. ["Rechargeable Lithium Ion Cell," U.S. Pat. No. 5,601,951, (Feb. 11, 1997)]. Again, this additional electrode further complicates the manufacture and operation of a resulting battery. The assembling operation of a battery containing a highly reactive lithium metal or alloy electrode must be handled in an oxygen-free and moisture-free environment.

Gao, et al. [Y. Gao, et al., "Lithium Metal Dispersion in Secondary Battery Anode," U.S. Pat. No. 6,706,447, Mar. 16, 2004 and U.S. Pat. No. 7,276,314 (Oct. 2, 2007)] disclosed a secondary battery containing an anode that is formed of a host material capable of absorbing and desorbing lithium in an electrochemical system and lithium metal dispersed in the host material. The lithium metal is a finely divided lithium powder and preferably has a mean particle size of less than about 20 microns. The host material comprises one or more materials selected from the group consisting of carbonaceous materials (e.g., graphite), Si, Sn, tin oxides, composite tin alloys, transition metal oxides, lithium metal nitrides and lithium metal oxides. The method of preparing such an anode includes the steps of providing a host material, dispersing lithium metal in the host material, and then forming the host material and the lithium metal dispersed therein into an anode. The lithium metal and the host material is mixed together with a non-aqueous liquid to produce a slurry and then applied to a current collector and dried to form the anode. Alternatively, the anode can be formed by chemical means by immersing the host material in a suspension of lithium metal in a non-aqueous liquid, and then formed into an anode. The approach of Gao, et al. has the following drawbacks:

(1) The anode is composed of an anode active material (e.g., graphite or Sn particles) and a discrete lithium metal phase (fine Li metal powder particles) forming a mixture of two types of particles. This implies that the anode still contains highly active lithium particles that are sensitive to oxygen and moisture and must be handled under very stringent conditions.

(2) The amount of lithium metal present in the anode is prescribed to be no more than the maximum amount sufficient to intercalate in, alloy with, or be absorbed by the host material in the anode. For example, if the host material is carbon, the amount of lithium is no more than the amount needed to make $LiC_6$. This implies that the amount of lithium needed for the SEI formation was not considered and, hence, the resulting battery will suffer a capacity loss of 10%-30% after the first cycle.

(3) It is of significance to note that although Gao, et al. mentioned in passing that the anode active material can be a mixture of carbon, Sn, Si, etc, the mixture still further contains lithium metal powder particles as an additional, discrete phase that is un-protected. The resulting multi-component, multi-phase mixture is still sensitive to the presence of oxygen and water contents in the air, thus significantly complicating the battery manufacturing operations.

(4) In a follow-on patent application, Gao, et al. [Y. Gao, et al. "Lithium metal dispersion in electrodes," US Patent Application Pub. No. 2005/0130043 (Jun. 16, 2005)] suggested methods of lithiating an electrode prior to combining electrodes and other components to form a battery. In all cases, the electrode is composed of a mixture of discrete lithium metal particles or wire screen and powder particles of a host material, the latter being partially lithiated. As shown in FIG. 1 of Gao, et al., the anode comprises discrete lithium metal particles and a host material. Both the discrete lithium metal particles and lithiated carbonaceous material (graphite) are unstable in an oxygen- or moisture-containing environment. Furthermore, Gao, et al. have not fairly suggested how other anode active materials than graphite can be prelithiated in a controlled manner (e.g., without inducing a lithium coating on the surface of active material particles). In fact, no example was given to illustrate if or how other important anode active materials can be successfully prelithiated prior to battery production. No battery testing or electrochemical performance evaluation data was given in any of Gao's patent or patent application to demonstrate the advantages of their electrodes.

Therefore, there exists an urgent need for a secondary lithium ion battery that has one or more of the following features or advantages:
a) The battery does not contain a sacrificial electrode or an extra electrode in addition to an anode and cathode in a cell;
b) The battery comprises an anode that does not contain a discrete lithium metal phase or lithium metal powder particles dispersed in the anode;
c) The anode comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or mesocarbon micro-beads, MCMBs).
d) The battery contains an anode that comprises at least a non-carbon active material possessing an ultra-high lithium absorbing capacity (e.g., Si that exhibits a specific capacity up to 3,500 or even 4,200 mAh/g);
e) The battery comprises an anode that contains an excess amount of lithium (disposed inside a non-carbon anode active material, not on its surface) to compensate for the formation of SEI layers, in addition to providing enough lithium to intercalate into (or form a compound with) a cathode active material.
f) The battery features a long and stable cycle life due to an anode that comprises fine, prelithiated active particles capable of maintaining their integrity and their contact with the conductive additive and the current collector.

Therefore, in summary, a need exists for an anode active material that has a high specific capacity, a minimal irreversible capacity (or a low decay rate), and a long cycle life. In order to accomplish these goals, we have worked diligently and intensively on the development of new electrode materials containing prelithiated particles of an anode active material and related production processes and apparatus. These research and development efforts led to the present patent application.

SUMMARY OF THE INVENTION

The present invention provides a process and related apparatus for producing an anode active material for a lithium battery (e.g. lithium-ion battery, lithium-sulfur battery, lithium-air battery, etc.). This new material enables the battery to deliver a significantly improved specific capacity and much longer charge-discharge cycle life. The material (in the form of prelithiated particles) also makes it possible to replace the lithium foil with a layer of prelithiated anode active material particles in a lithium metal cell (e.g. lithium-sulfur, lithium-air, lithium-metal fluoride, lithium-metal oxide cells, etc.).

In certain embodiments, the invention provides a process for producing prelithiated particles of an anode active material for a lithium battery. These prelithiated particles are produced prior to being made into an anode electrode. The process comprises: (a) Providing a lithiating chamber having at least one inlet (where starting materials are fed through) and at least one outlet (where reacting products are removed or discharged from the chamber); (b) Feeding a plurality of particles of an anode active material, lithium metal particles, and an electrolyte solution containing a lithium salt dissolved in a liquid solvent, concurrently or sequentially, into said lithiating chamber through said at least one inlet to form a reacting mixture; (c) Moving said reacting mixture toward said at least one outlet at a rate sufficient for inserting a desired amount of lithium into said anode active material particles to form a slurry of prelithiated particles dispersed in said electrolyte solution; and (d) Discharging said slurry out of said lithiating chamber through said at least one outlet.

Preferably, step (b) of feeding, step (c) of moving, and step (d) of discharging are conducted in a continuous manner.

The particles of an anode active material, lithium metal particles, and an electrolyte solution (containing a lithium salt dissolved in a liquid solvent) can be separately added into the lithiating chamber concurrently or sequentially. Alternatively, two of these three components (e.g. Si particles and lithium metal chips, or Si particles and electrolyte solution, etc.) may be mixed first and the resulting mixture is fed into the lithiating chamber, before or after the third component is fed. Various sequences may be followed to feed these 3 components (the 3 starting materials) into the lithiating chamber, through one or multiple inlets (e.g. feeder troughs, hoppers, etc.).

At least one of the prelithiated particles produced contains an amount of lithium from 1% to 100% of a maximum lithium content or maximum charge storage capacity contained in the anode active material. The maximum lithium content in an active material may be defined as the theoretical capacity of this material. For instance, when Si is fully charged with lithium, the resulting material may be represented by a formula $Li_{4.4}Si$, which indicates a maximum charge storage capacity of 4,200 mAh/g and corresponds to a lithium weight fraction of 57.4% based on the weight of this fully lithiated Si material. The insertion of the amount of lithium corresponding to 2,100 mAh/g capacity or 28.7% by weight of Li implies a 50% lithium content. Other examples include $Li_{4.4}Ge$ (maximum capacity of Ge=1,623 mAh/g), $Li_{4.4}Sn$ (maximum capacity of Sn=993 mAh/g), $Li_3Cd$ (maximum capacity of Cd=715 mAh/g), $Li_3Sb$ (maximum capacity of Sb=660 mAh/g), $Li_{4.4}Pb$ (569 mAh/g), LiZn (410 mAh/g), and $Li_3Bi$ (385 mAh/g).

In some embodiments, the step of providing particles of an anode active material comprises providing a doped semiconductor material selected from Si or Ge doped with n-type and/or p-type dopants.

In certain embodiments, the slurry produced in step (c) is discharged into a receptor container. This container is preferably a sealed container that protects the slurry from exposing to room air or moisture. This container can be as simple as a sealed plastic bag or laminated bag.

In some embodiments, the process further comprises a step of treating the discharged slurry for separating and recovering the prelithiated particles from the electrolyte solution. This can be accomplished by drying the solution using various drying procedures (e.g. oven drying, spray drying, etc.), filtration, centrifugation, etc.

In the process, the lithiating chamber may contain one or two (or more) rotating screws that drive the reacting mixture toward the least one outlet. This portion of the apparatus is similar to that of a single-screw or twin-screw extruder commonly used in plastics processing industry.

Preferably, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof. In a particularly desired embodiment, the prelithiated particles comprise $Li_xSi$, wherein numerical x is from 0.01 to 4.4.

The anode active material particles may be in a form of nano particle, nano wire, nano fiber, nano tube, nano sheet, nano belt, nano ribbon, nano disc, nano platelet, or nano horn having a thickness or diameter from 0.5 nm to 100 nm. In certain embodiments, the particles contain a sub-micron or micron particle having a dimension (diameter or thickness) from 100 nm to 30 μm.

In certain embodiments, prior to being fed into the lithiating chamber, the particles are coated with a layer of carbon, graphene, electron-conducting polymer, ion-conducting polymer, or a combination thereof.

In some embodiments, the process further comprises means of producing a surface-stabilizing layer to embrace the surfaces of the prelithiated particles. Such a surface-stabilizing layer may comprise a lithium- or sodium-containing species chemically bonded to the prelithiated particle surfaces and the lithium- or sodium-containing species is preferably selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, x=0-1, y=1-4; wherein the lithium- or sodium-containing species is preferably derived from an electrochemical decomposition reaction.

The afore-mentioned process may further comprise feeding a solution of a lithium salt or sodium salt dissolved in a liquid solvent into the lithiating chamber to form a multi-component slurry, which is discharged from the lithiating chamber and introduced into an encapsulating device that encapsulates the prelithiated particles with a surface-stabilizing layer of lithium- or sodium-containing species. The encapsulating device may be selected from a spray dryer, a pan-coating device, an air-suspension coating device, a centrifugal extrusion device, or a vibration nozzle.

The invented process may further comprise feeding a solution of a polymer or monomer into the lithiating chamber wherein the polymer or monomer forms a protective polymer layer encapsulating the prelithiated particles after the slurry is discharged. For example, a polymer may be dissolved in a solvent (the same as or different than the liquid solvent in the electrolyte) to form a solution that is fed into the lithiating chamber through an inlet (preferably nearer the outlet and away from the inlets for starting materials; e.g. near the mid-section of the chamber). The discharged slurry may then be dried (e.g. using spray-drying) to obtain polymer layer-protected prelithiated particles. The polymer preferably and typically fully embraces or encapsulates the prelithiated particles. The polymer is preferably electron-conducting and/or ion-conducting.

To accomplish the above purpose, the process may further comprise feeding a solution of a polymer or monomer into the lithiating chamber to form a multi-component slurry, which is discharged from the lithiating chamber and is introduced into an encapsulating device that encapsulates the prelithiated particles with a protective polymer layer. The monomer may have to be polymerized or cured after the encapsulation procedure is conducted. The encapsulating device may be selected from a spray dryer, a pan-coating device, an air-suspension coating device, a centrifugal extrusion device, or a vibration nozzle This protective polymer layer preferably comprises a high-elasticity polymer encapsulating the prelithiated particles wherein the high-elasticity polymer has a fully recoverable tensile elastic strain from 5% to 700%, a thickness from 0.5 nm to 2 μm, and a lithium ion conductivity from $10^{-7}$ S/cm to $5 \times 10^{-2}$ S/cm at room temperature. The elastic strain implies a deformation that is fully recoverable upon release of the mechanical load that originally causes the deformation and such a recovery process is essentially instantaneous without any significant time delay.

The high-elasticity polymer preferably and typically has a fully recoverable tensile strain from 10% to 300%, a thickness from 1 nm to 0.5 μm, and a lithium ion conductivity from $10^{-6}$ S/cm to $5 \times 10^{-2}$ S/cm at room temperature. The high-elasticity polymer may contain an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

In certain embodiments, the high-elasticity polymer contains an elastomer matrix composite containing a lithium ion-conducting additive dispersed in an elastomer matrix material, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

The high-elasticity polymer may contain an elastomer matrix composite containing a lithium ion-conducting additive dispersed in an elastomer matrix material, wherein said lithium ion-conducting additive contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoroethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

In some embodiments, the high-elasticity polymer contains a mixture or blend of an elastomer and an electron-conducting polymer selected from polyaniline, polypyrrole, polythiophene, polyfuran, a bi-cyclic polymer, a sulfonated derivative thereof, or a combination thereof.

In certain embodiments, the high-elasticity polymer contains a mixture or blend of an elastomer and a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

DETAILED DESCRIPTION OF PREFERRED EMBODIMENTS

Figure 1:
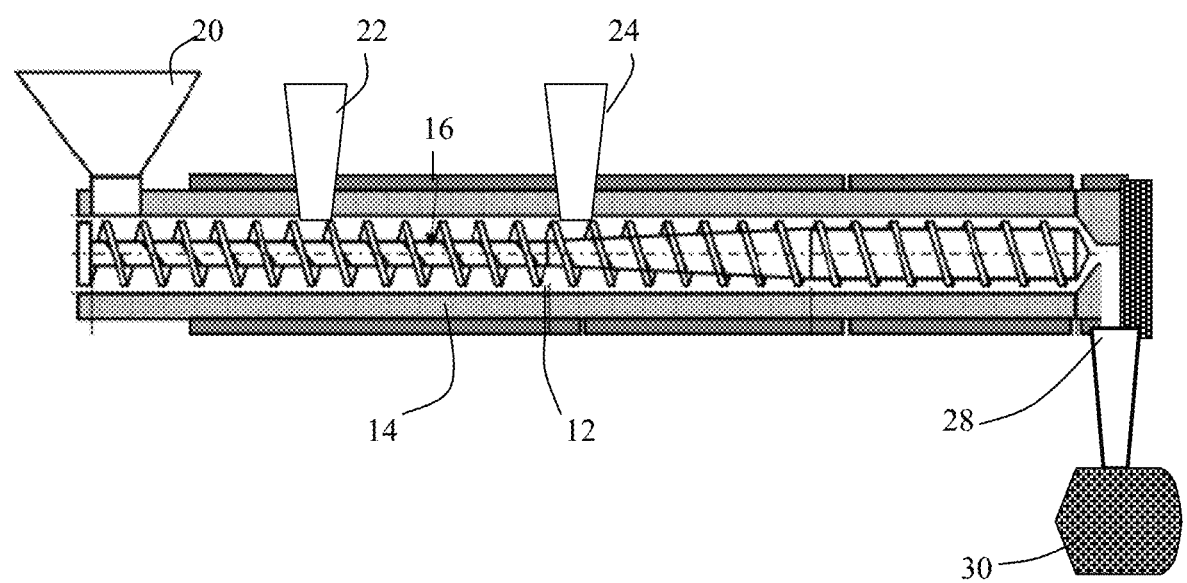
FIG. 1 Schematic of an apparatus for prelithiating particles of an anode active material, according to a preferred embodiment of the present invention.

This invention is related to a process and apparatus for producing anode materials for high-capacity lithium batteries, which are preferably secondary batteries based on a non-aqueous electrolyte, a polymer gel electrolyte, polymer electrolyte, quasi-solid electrolyte, or solid-state electrolyte. The shape of a lithium metal or lithium ion battery can be cylindrical, square, button-like, etc. The present invention is not limited to any battery shape or configuration.

In some embodiments, the invention provides a process for producing prelithiated particles of an anode active material for a lithium battery. The process comprises: (a) providing a lithiating chamber having at least one inlet (where starting materials are fed through) and at least one outlet (where reacting products are removed or discharged from the chamber); (b) feeding a plurality of particles of an anode active material, lithium metal particles, and an electrolyte solution containing a lithium salt dissolved in a liquid solvent, concurrently or sequentially, into the lithiating chamber through the at least one inlet to form a reacting mixture; (c) moving the reacting mixture toward the at least one outlet at a rate sufficient for inserting a desired amount of lithium into the anode active material particles to form a slurry of prelithiated particles dispersed in the electrolyte solution; and (d) discharging the slurry out of the lithiating chamber through the at least one outlet. Preferably, step (b) of feeding, step (c) of moving, and step (d) of discharging are conducted in a continuous manner.

For a lithium ion battery, according to a preferred embodiment of the present invention, the starting anode active material (in a fine powder form) may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

Prior to prelithiation, particles of the anode active material may be coated with a carbonizable coating material (e.g., phenolic resin, poly(furfuryl alcohol), coal tar pitch, or petroleum pitch). The coating can then be carbonized to produce an amorphous carbon or polymeric carbon coating on the surface of these Si particles. Such a conductive surface coating can help maintain a network of electron-conducting paths during repeated charge/discharge cycles and prevent undesirable chemical reactions between Si and electrolyte from happening. Hence, the presently invented method may further comprise a step of coating a surface of the fine particles with a thin layer of carbon having a thickness less than 1 μm prior to being fed into the lithiating chamber. The thin layer of carbon preferably has a thickness less than 100 nm. Such a thin layer of carbon may be obtained from pyrolization of a polymer, pitch, or organic precursor or obtained by chemical vapor deposition, physical vapor deposition, sputtering, etc.

Alternatively, the particles of an anode active material may be coated with a layer of graphene, electron-conducting polymer, or ion-conducting polymer. Such coating processes are well-known in the art.

Prelithiation can be accomplished in several different ways that can be classified into 3 categories: physical methods, electrochemical methods, and chemical methods. The prevent invention allows for the chemical method and/or electrochemical method to proceed in a lithiating chamber.

The process begins with providing a lithiating chamber having at least one inlet (where starting materials are fed through) and at least one outlet (where reacting products are removed or discharged from the chamber). As illustrated schematically in FIG. 1, the chemical or electrochemical reactions required of lithiating anode active material particles can be advantageously conducted using an apparatus containing a single-screw or twin-screw extruder. There are three inlets (20, 22, and 24) and one outlet (28) are shown to be associated with this single-screw extrusion device, but there can be any desired number of inlets and any desired number of outlets as needed. The chamber 12 between the screw 16 and the barrel 14 serves as a lithiating chamber. The products after being discharged through the outlet 28 may be collected in a receptor container 30.

As some preferred examples used for illustrative purposes, a mixture of anode active material particles (e.g. Si or Sn particles) and lithium particles (small lithium chips, lithium wire segments, or other shapes having a length or diameter preferably less than 100 µm) is dispersed in a liquid solvent to form a suspension. This suspension may be fed into an inlet (e.g. hopper 20), which is moved forward toward the outlet 28 (from left to right in this diagram). The screw movement acts to mix the anode particles and lithium particles together, bringing the two materials into an intimate contact. A lithium salt solution is then added through inlet 22 that effectively activates the lithiating process. In this situation, the anode particles and lithium are brought to be in an internal shorting state, having the potential difference between Si (or Sn) and Li being reduced from originally some 1.5 to 4 volts to essentially zero volts (vs. Li/Li$^+$), below the lithium intercalation voltage. This condition permits intercalation of Si particles (or particles of all other types of anode active materials) by lithium. The travel time along the screw length can be controlled by the screw rotational speed and the screw length to ensure complete lithium intercalation or insertion to a desired extent.

The chemical methods may be conducted by sourcing lithium atoms from active reactants or lithium metal. The active reactants can include organometallic compounds and lithium salts and the reactions can be effectuated in the activating chamber of the present invention.

It may be noted that lithium may be pre-coated onto the surfaces of anode active material particles prior to being fed into the activating chamber. Such a coating may be deposited using thermal evaporation, electron beam evaporation, sputtering, and laser ablation.

Preferably, the lithium salt in the liquid electrolyte is selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTFSI), or a combination thereof. It may be noted that these metal salts are also commonly used in the electrolytes of rechargeable lithium batteries.

The electrolytes used in this lithiating chamber may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. These solvents are also commonly used in the electrolytes of rechargeable lithium batteries.

The aforementioned prelithiation processes are applicable to all of the anode active materials discussed in the present specification, not just Si, although Si is used as an example to illustrate the best-mode practice. The anode active material preferably comprises silicon and the prelithiated particles comprise a prelithiated silicon Li$_4$Si, Li$_{4.4}$Si, or Li$_x$Si, wherein numerical x is between 1 and 4.4. The step of providing an anode active material may comprise providing a doped semiconductor material. Such a doped semiconductor material may be selected from Si or Ge doped with n-type and/or p-type dopants. Commonly used n-type dopants are P, As, and Sb and commonly used p-type dopants are Al, Ga, and In.

The prelithiated particles of an anode active material (with or without a coating of carbon, graphene, electron-conducting polymer, or ion-conducting polymer), after prelithiation, may be further encapsulated by a thin layer of a high-elasticity polymer (e.g. an elastomer) having a fully recoverable tensile strain of from 5% to 700% and a thickness preferably from 0.5 nm to 2 µm (preferably from 1 nm to 100 nm). The elastomer preferably has a lithium ion conductivity from $10^{-7}$ S/cm to $5 \times 10^{-2}$ S/cm at room temperature (preferably and typically no less than $10^{-6}$ S/cm, further preferably no less than $10^{-5}$ S/cm, more preferably no less than $10^{-4}$ S/cm, and most preferably no less than $10^{-3}$ S/cm).

Several micro-encapsulation processes can be used to embrace/encapsulate prelithiated particles of an anode active material with a protective layer containing a high-elasticity polymer. The encapsulation may be conducted after the product slurry exits the outlet 28, dried and separated from the liquid electrolyte. The encapsulation normally requires dissolution of a polymer or a polymer precursor (monomer or oligomer) in a solvent (including mixture of multiple solvents) to form a polymer solution. This solution can then be used to encapsulate solid particles via several of the micro-encapsulation methods, such pan-coating, air-suspension coating, centrifugal extrusion, vibration nozzle, and spray-drying methods.

Advantageously, the polymer solution may be fed though an inlet 24 near the mid-section into the lithiating chamber of the extrusion system. The resulting slurry (containing prelithiated particles and a polymer solution) is discharged through an outlet (e.g. 28) and directly fed into a spray dryer or any other particle-forming device (e.g. pan-coating, air-suspension coating, centrifugal extrusion, or vibration nozzle device). It is not necessary to use a collector container (e.g. 30) to collect the discharged slurry. The slurry is directly introduced into the atomizer head of a spray dryer to produce droplets which, upon drying (by removing the solvent), become dried particulates each having a layer of high-elasticity polymer embracing one or several prelithiated particles.

The high-elasticity material may be an elastomer matrix composite containing from 0.1% to 50% by weight (preferably from 1% to 35% by weight) of a lithium ion-conducting additive dispersed in an elastomer matrix material.

The elastomer, alone as a high-elasticity polymer or as a matrix material containing an additive, may contain a material selected from natural polyisoprene (e.g. cis-1,4-polyisoprene natural rubber (NR) and trans-1,4-polyisoprene guttapercha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In some embodiments, the high-elasticity polymer is an elastomer matrix composite containing a lithium ion-conducting additive dispersed in an elastomer matrix material, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the elastomer matrix composite contains a lithium ion-conducting additive dispersed in an elastomer matrix material, wherein said lithium ion-conducting additive contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

The high-elasticity polymer may contain a mixture or blend of an elastomer and an electron-conducting polymer selected from polyaniline, polypyrrole, polythiophene, polyfuran, a bi-cyclic polymer, derivatives thereof (e.g. sulfonated versions), or a combination thereof.

In some embodiments, the high-elasticity polymer contains a mixture or blend of an elastomer and a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof.

In certain embodiments, the prelithiated anode active material particles in the lithiating chamber may be subjected to a surface treatment that eventually produces a surface-stabilizing coating to embrace the prelithiated particles, wherein this surface-stabilizing coating is a layer of lithium- or sodium-containing species that are chemically bonded to the prelithiated particles.

In a preferred embodiment, the lithium- or sodium-containing species are selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group (e.g. R=CH—, $CH_2$—, $CH_3CH_2$—, etc.), x=0-1, y=1-4. These species are surprisingly capable of chemically bonding to surfaces of various anode active material particles to form a structurally sound encapsulating layer. Such a layer is also permeable to lithium ions, enabling subsequent lithium intercalation/insertion and de-intercalation/extraction into/from the protected particles. There can be not just one, but at least two types of lithium- or sodium-containing species in the above list that are present in the protective layer embracing the prelithiated particles.

Several micro-encapsulation processes can be used to embrace/encapsulate prelithiated particles of an anode active material with a protective layer containing the desired lithium- and/or sodium-containing species. This requires dissolution of a lithium salt, a sodium salt, multiple lithium salts, and/or multiple sodium salts in a solvent (including mixture of multiple solvents) to form a solution. This solution can then be used to encapsulate solid particles via several of the micro-encapsulation methods to be discussed in what follows.

The salt may be selected from any lithium or sodium metal salt that is dissolvable in a solvent to produce a liquid solution. Preferably, the metal salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), sodium perchlorate ($NaClO_4$), sodium hexafluorophosphate ($NaPF_6$), sodium borofluoride ($NaBF_4$), sodium trifluoro-metasulfonate ($NaCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide sodium ($NaN(CF_3SO_2)_2$), or a combination thereof. It may be noted that these metal salts are also commonly used in the electrolytes of rechargeable lithium or sodium batteries.

The liquid solvent may contain a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof. These solvents are also commonly used in the electrolytes of rechargeable lithium or sodium batteries.

Once the solution is made, the solution can be used in several micro-encapsulation methods to produce encapsulated particles of an anode active material: including pan-coating, air-suspension coating, centrifugal extrusion, vibration nozzle, and spray-drying methods. Preferably, the solution is introduced through an inlet (e.g. 24) into the lithiating chamber and the discharged slurry is then introduced into one of the coated particulate-forming devices, such as the atomizer head of a spray dryer.

Pan-Coating Method:

The pan coating process involves tumbling the active material particles in a pan or a similar device while the encapsulating material (e.g. highly concentrated solution of Li/Na salts in a solvent) is applied slowly until a desired encapsulating shell thickness is attained.

Air-Suspension Coating Method:

In the air suspension coating process, the solid particles (core material) are dispersed into the supporting air stream in an encapsulating chamber. A controlled stream of a salt-solvent solution (with an optional polymer) is concurrently introduced into this chamber, allowing the solution to hit and coat the suspended particles. These suspended particles are encapsulated (fully coated) with the salts while the volatile solvent is removed, leaving a very thin layer of Li and/or Na salts on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Anode active materials may be encapsulated using a rotating extrusion head containing concentric nozzles. In this process, a stream of core fluid (slurry containing prelithiated particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational Nozzle Method:

Core-shell encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry).

Spray-Drying:

Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material.

The protective layer of the instant invention typically exhibits a lithium ion or sodium ion conductivity from $2.5 \times 10^{-5}$ S/cm to $5.5 \times 10^{-3}$ S/cm, and more typically from $1.0 \times 10^{-4}$ S/cm to $2.5 \times 10^{-3}$ S/cm. The anode active material may be made into a thin film and then the Li- or Na-containing species are coated thereon and then peeled off to allow for ion conductivity measurement.

In the preparation of an anode electrode, acetylene black (AB), carbon black (CB), or ultra-fine graphite particles may be used as a conductive additive. Conductive additives may comprise an electrically conductive material selected from the group consisting of electro-spun nano fibers, carbonized electro-spun nano fibers, vapor-grown carbon or graphite nano fibers, carbon or graphite whiskers, carbon nano-tubes, nano-scaled graphene platelets, metal nano wires, metal-coated nano wires, carbon-coated nano wires, metal-coated nano fibers, carbon-coated nano fibers, and combinations thereof. A binder material may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used as a binder. A typical mixing ratio of these ingredients is 80 to 85% by weight for the anode active material, 5 to 15% by weight for the conductive additive, and 5 to 10% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a polymeric nonwoven fabric, porous polyethylene film, porous polypropylene film, or porous PTFE film.

The electrode fabrication may comprise combining multiple fine particles of prelithiated anode active material with a conductive additive and/or a binder material, plus a desired amount of another type of anode active materials selected from particles of graphite, hard carbon, soft carbon, meso-carbon micro-bead, surface-modified graphite, carbon-coated graphite, or a combination thereof.

Hence, a lithium ion battery may contain an anode that comprises at least two types of anode active material wherein at least one type of active material is prelithiated (e.g., Si and Sn) and at least one type of active material is not prelithiated (e.g., carbonaceous material, such as graphite, hard carbon, soft carbon, surface-modified graphite, chemically modified graphite, or meso-carbon micro-beads, MCMBs). Prelithiated carbonaceous anode materials are unstable in regular room air. The present invention enable the battery to contain an anode that comprises at least a non-carbon active material possessing an ultra-high lithium absorbing capacity (e.g., Si that exhibits a specific capacity up to 4,200 mAh/g). The battery comprises an anode that contains an excess amount of lithium (disposed inside a non-carbon anode active material, not on its surface) to compensate for the formation of SEI layers, in addition to providing enough lithium to intercalate into (or form a compound with) a cathode active material.

The present invention allows the excess amount of lithium to be stored in high-capacity anode active materials (there is no need to make use of the full capacity of Si, for instance). The capacity limitation is on the cathode side, rather than the anode side. The present approach obviates the need for the cathode to supply the needed lithium, thereby further reducing the needed initial weight of the cathode or increasing the cathode weight that can be incorporated in a cell. This strategy can increase the overall capacity of a lithium ion battery by another 10%-20%.

There is no limitation on the types of cathode materials that can pair up with the presently invented anode materials. The positive electrode active material may be selected from a wide variety of oxides, such as lithium-containing nickel oxide, lithium-containing cobalt oxide, lithium-containing nickel-cobalt oxide, lithium-containing vanadium oxide, lithium iron phosphate, lithium manganese phosphate, lithium manganese-iron phosphate, and other lithium metal (or mixed metals) phosphate. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$), lithium manganese oxide (e.g., $LiMn_2O_4$ and $LiMnO_2$), lithium iron phosphate, lithium manganese-iron phosphate, lithium vanadium phosphate because these oxides provide a relatively high cell voltage and relatively good cycling stability.

Lithium cobalt oxide ($LiCoO_2$) is one of the most important cathode materials used in lithium-ion secondary batteries. $LiCoO_2$ and other similar lithium transition metal oxides, such as lithium manganese oxide, lithium nickel oxide, and lithium vanadium oxide, can be prepared by various methods using different lithium and transition metal sources. In general, bulk transition metal oxides are prepared by solid-state reactions, which involve repeated heat processes at high temperatures. Such processes generally afford the thermodynamically more stable phases and in general, microcrystalline materials are obtained. Lower temperatures and mild processing conditions may be used for several methods, such as co-precipitation, sol-gel process with/without template, synthesis by precursor, ion-exchange reaction and hydrothermal. These methods also result in particles with better control of morphology and smaller size. Other methods include flame spray pyrolysis, dehydro-freezing evaporation, supercritical dehydration, supersonic hydrothermal synthesis, and ultrasonic processing.

As an example, a process for producing lithium-cobalt oxide my include (a) mixing cobalt oxide having an average particle size of not more than 0.1 μm, with a lithium compound; and (b) calcining the obtained mixture at a temperature of 500 to 850° C. As compared to the conventional processes that begin with larger cobalt oxide particles (e.g., diameter >10 μm), such a process is advantageous in that lithium-cobalt oxide particles (1) can be produced with a short calcination time, (2) have a narrow particle size distribution, and (3) have a uniform small particle size.

The flame-spray pyrolysis method may include the steps of: (a) spraying minute droplets containing a solution of dissolved lithium salt and cobalt salt at room temperature; (b) atomizing the minute droplets through rapid expansion into a high temperature environment generated by combusting oxygen and hydrogen; (c) decomposing and oxidizing the atomized minute droplets thermally at high temperature to produce nano-sized oxides in gaseous phase; and (d) collecting the produced nano-sized composite oxides particles.

Lithium iron phosphate $LiFePO_4$ is a promising candidate of cathode material for lithium-ion batteries. The advantages of $LiFePO_4$ as a cathode active material includes a high theoretical capacity (170 mAh/g), environmental benignity, low resource cost, good cycling stability, high temperature capability, and prospect for a safer cell compared with $LiCoO_2$. A major drawback with this material is that it has very low electronic conductivity, on the order of $10^{-9}$ S/cm². This renders it difficult to prepare cathodes capable of operating at high rates. In addition, poor solid-phase transport means that the utilization of the active material is a strong function of the particle size. This major problem may be overcome by using a nano-scaled powder (to reduce the Li ion diffusion path and electron transport path distance) and doping the powder with a transition metal. Lithium iron phosphate ($LiFePO_4$) nano particles may be prepared by ball milling of conventional micron-sized particles, which may be prepared by a solid state reaction using $LiOH.H_2O$, $(CH_3COO)_2Fe$, and $NH_4H_2PO_4$ as raw materials. Additionally, $Li_{1.3}Al_{0.3}Ti_{1.7}(PO_4)_3$ materials, as an example of lithium mixed-metal phosphate, may be successfully prepared by the solution deposition using lithium acetate, aluminum nitrate, ammonium dihydrogen phosphate and titanium butoxide as starting materials. The resulting material may be ball-milled to sub-micron or nanometer scales. This is but one example of a host of complex metal phosphate-based cathode materials.

A wide range of electrolytes can be incorporated into the lithium cells. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably from 0.5 to 2.0 mol/l.

Example 1: Cobalt Oxide ($Co_3O_4$) Anode Particles

An appropriate amount of inorganic salts $Co(NO_3)_2 \cdot 6H_2O$ and ammonia solution ($NH_3 \cdot H_2O$, 25 wt. %) were mixed together. The resulting suspension was stirred for 2 hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with a phenolic resin, which was then carbonized at 500° C. for 2 hours and 900° C. for another 2 hours.

A sample of $Co_3O_4$ particles and a sample of carbon-coated $Co_3O_4$ particles were then lithiated to produce prelithiated particles. Some of the prelithiated particles and, separately, some of the non-lithiated particles were then surface-protected by a layer of $Li_2CO_3$ and $Li_2O$ formed by solution injection into the lithiating chamber and spray drying after slurry discharge from the extruder.

For electrochemical testing, the working electrodes were prepared by mixing 85 wt. % active material (encapsulated or non-encapsulated particulates of $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk (φ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using an electrochemical workstation at a scanning rate of 1 mV/s.

The electrochemical performance of the particulates of encapsulated prelithiated $Co_3O_4$ particles and that of non-protected $Co_3O_4$ were evaluated by galvanostatic charge/discharge cycling at a current density of 50 mA/g, using an electrochemical workstation. The results indicate that the charge/discharge profiles for the encapsulated $Co_3O_4$ particle- and un-protected $Co_3O_4$ particle-based electrodes show a long voltage plateau at about 1.06 V and 1.10 V, respectively, followed by a slopping curve down to the cut-off voltage of 0.01 V, indicative of typical characteristics of voltage trends for the $Co_3O_4$ electrode.

Figure 2:
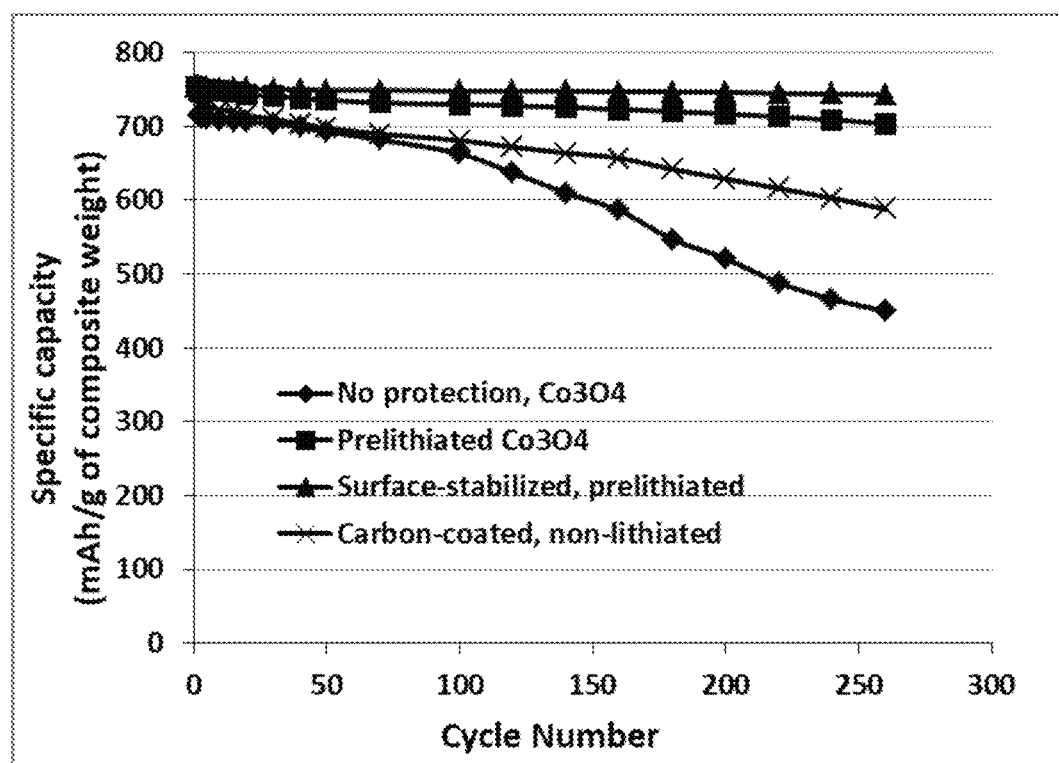
FIG. 2 The specific capacities of 4 lithium batteries: one having an anode active material featuring surface-stabilized and prelithiated $Co_3O_4$ particles, one having prelithiated but non-stabilized $Co_3O_4$ particles, one having carbon-coated but non-prelithiated $Co_3O_4$ particles, and one having un-protected $Co_3O_4$ particles.

FIG. 2 shows the specific capacities of 4 lithium batteries: one having an anode active material featuring surface-stabilized and prelithiated $Co_3O_4$ particles, one having prelithiated but non-stabilized $Co_3O_4$ particles, one having carbon-coated but non-prelithiated $Co_3O_4$ particles, and one having un-protected and non-prelithiated $Co_3O_4$ particles. The testing results indicate that the first-cycle lithium insertion capacities for all the $Co_3O_4$-based anode active materials are 753-756 mAh/g, which are higher than the theoretical values of graphite (372 mAh/g). All cells, except for the one containing the surface-stabilized and prelithiated $Co_3O_4$, exhibit some first-cycle irreversibility. The first-cycle efficiency values for these 4 cells are 100% for surface-stabilized and prelithiated $Co_3O_4$ particles, 99.3% for prelithiated but non surface-stabilized $Co_3O_4$ particles, 96% for carbon-coated but non-prelithiated $Co_3O_4$ particles, and 93% for un-protected and non-prelithiated $Co_3O_4$ particles. The initial capacity loss likely has resulted mainly from the formation of solid electrolyte interface (SEI) layers on the surfaces of anode active material particles.

As the number of cycles increases, the specific capacity of the bare $Co_3O_4$ electrode drops precipitously. Compared with its initial capacity value of approximately 755 mAh/g, its capacity suffers a 20% loss after 150 cycles and a 40% loss after 260 cycles. By contrast, the presently invented surface-stabilized and prelithiated particles provide the battery cell with a very stable and high specific capacity for a large number of cycles, experiencing a capacity loss of less than 1.3% after 260 cycles. The surface-stabilized particles (without prelithiation) enable the cell to suffer only a 6% capacity loss after 260 cycles. These data have clearly demonstrated the surprising and superior performance of the presently invented electrode materials compared with prior art un-prelithiated and/or un-protected particle-based electrode materials.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently invented cells (not just button cells, but large-scale full cells) is typically from 1,500 to 4,000.

Example 2: Surface-Stabilized Prelithiated Tin Oxide Particles

Tin oxide ($SnO_2$) nano particles were obtained by the controlled hydrolysis of $SnCl_4.5H_2O$ with NaOH using the following procedure: $SnCl_4.5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere.

Samples of various different tin oxide particles were subjected to electrochemical prelithiation and/or electrochemical formation of lithium-containing species bonded to particle surfaces using lithium hexafluorophosphate ($LiPF_6$) as the salt dissolved in EC-PC (50/50) as an electrolyte solution. The resulting surface stabilizing layer is composed of predominantly a mixture of $Li_2O$ and LiF.

Figure 3:
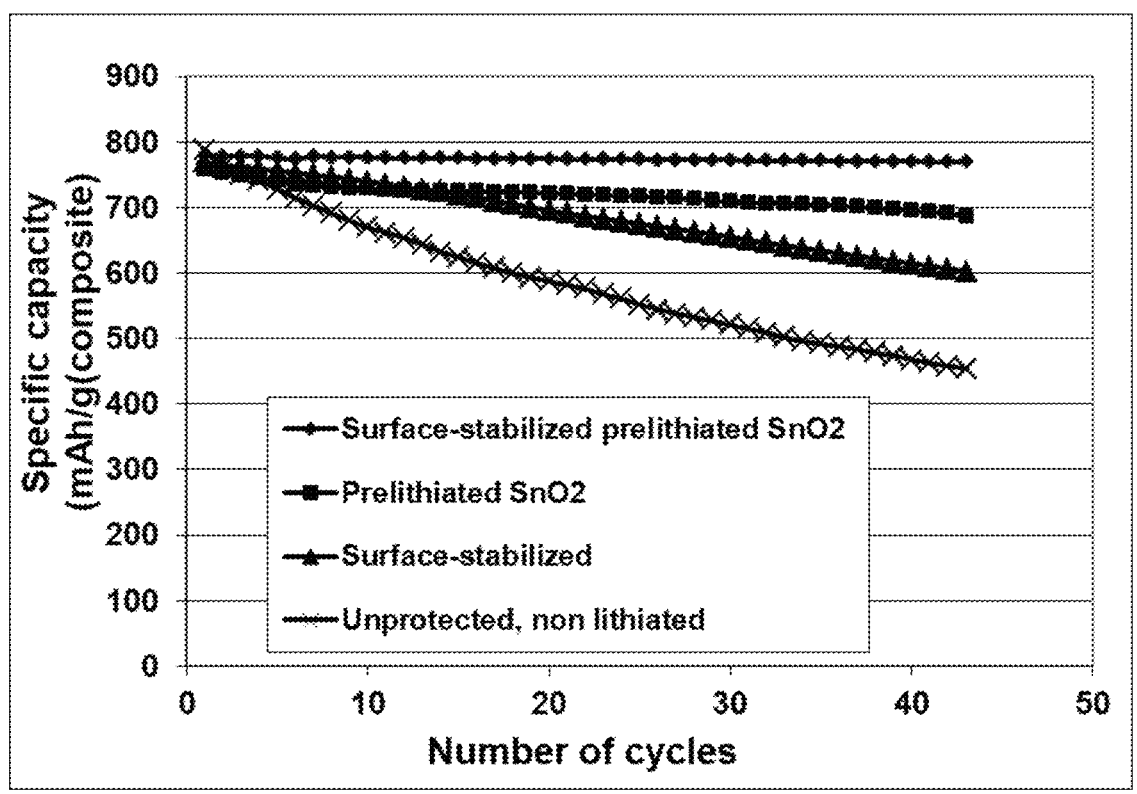
FIG. 3 The specific capacities of 4 lithium batteries having an anode active material featuring $SnO_2$ particles that are prelithiated and surface-stabilized, prelithiated (not surface-stabilized), surface-stabilized (not prelithiated), and un-protected (non-stabilized and non-prelithiated, respectively.

The battery cells from these nano-scaled $SnO_2$ particles (with or without surface protection species or prelithiation) were prepared using a procedure schematically discussed in FIG. 1. Shown in FIG. 3 are the specific capacities of 4 lithium batteries having an anode active material featuring $SnO_2$ particles that are prelithiated and surface-stabilized, prelithiated (not surface-stabilized), surface-stabilized (not prelithiated), and un-protected (non-stabilized and non-prelithiated), respectively. The anode prepared according to the presently invented surface protection and prelithiation approach offers a significantly more stable and higher reversible capacity compared to the un-coated $SnO_2$ particle-based anode.

Example 3: Surface-Stabilized Prelithiated Tin (Sn) Nano Particles

Nano particles (76 nm in diameter) of Sn were encapsulated with a thin layer of phenolic resin shell via the spray-drying method, followed by a heat treatment from 350-600° C. for 4 hours to obtain carbon-coated Sn nano particles. Half of these C-coated Sn particles were subjected to encapsulation by a mixture of $Li_4B$, $Na_4B$, and NaF, which were obtained by electrochemical decomposition of an electrolyte containing lithium boron-fluoride ($LiBF_4$) and $NaBF_4$ dissolved in DEC. Un-protected Sn nano particles from the same batch were also investigated to determine and compare the cycling behaviors of the lithium-ion batteries containing these particles as the anode active material.

Figure 4:
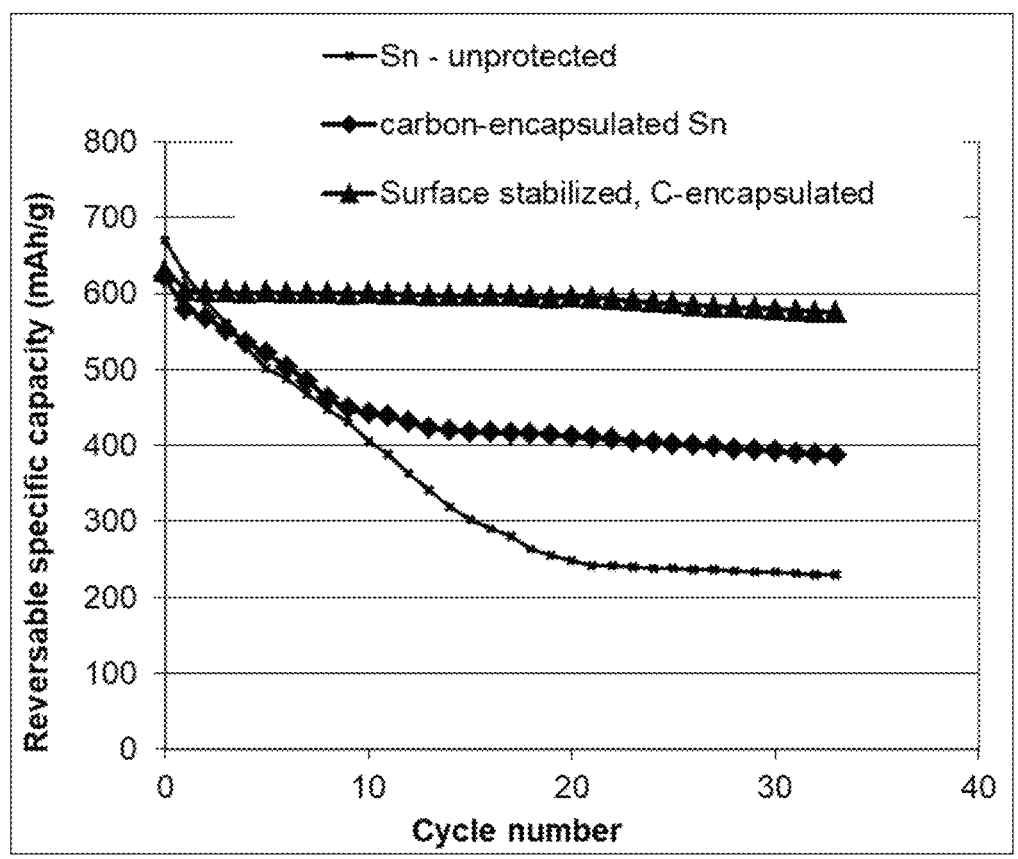
FIG. 4 The specific capacities of 3 lithium batteries: one having an anode active material featuring surface-stabilized carbon-encapsulated Sn particles, one having carbon-encapsulated Sn particles, and one having un-protected Sn particles.

Shown in FIG. 4 are the specific capacities of 3 lithium batteries: one having an anode active material featuring surface-stabilized carbon-encapsulated Sn particles, one having carbon-encapsulated Sn particles, and one having un-protected Sn particles. These results have clearly demonstrated that encapsulation of carbon-coated Sn particles by the presently invented surface-stabilizing species provides the very best protection against capacity decay of a lithium-ion battery featuring a high-capacity anode active material. Carbon encapsulation is not good enough to provide the necessary protection.

Example 4: Surface-Stabilized Prelithiated Si Nanowire-Based Anode Materials In a typical procedure of Si nanowire production, approximately 2.112 g of silicon powders (average diameter 2.64 μm) were mixed with 80 ml of a 0.1M aqueous solution of $Ni(NO_3).6H_2O$ and vigorously stirred for 30 min. Then, water was evaporated in a rotary evaporator and the solid remnants were completely dried in an oven at 150° C. The final sample (Ni-impregnated Si powers) was obtained by grinding the solids in a mortar.

Subsequently, 0.03 g of Ni-impregnated Si particles was placed in a quartz boat, and the boat was placed in a tube furnace. The sample was reduced at 500° C. for 4 hours under flowing Ar (180 sccm) and $H_2$ (20 sccm), then the temperature was raised to 990° C. to catalytically synthesize Si nanowires; Si nanowires were found to emanate from original micron-scaled Si particles. For the purpose of separating Si nanowires, for instance, every 0.1 g of the reacted Si powders was mixed with 10 ml of ethanol and the resulting mixture was sonicated for 1 hour. Subsequently, Si nanowires were separated from the Si powders by centrifuge at 5,000 rpm for 10 min.

Some Si nanowires were coated with a layer of amorphous carbon and then prelithiated using the invented prelithiation process. Some prelithiated Si nano wires were further encapsulated by a thin layer of $Li_2O$ and LiF using a dry-air exposure (to form $Li_2O$) and then electrochemical decomposition. For comparison purposes, Si nanowires protected by carbon coating (but no prelithiation and no surface stabilization) were also prepared and implemented in a separate lithium-ion cell. In all three cells, approximately 25-30% of graphite particles were mixed with the protected or unprotected Si nanowires (SiNW), along with 5% binder resin, to make an anode electrode.

Figure 5:
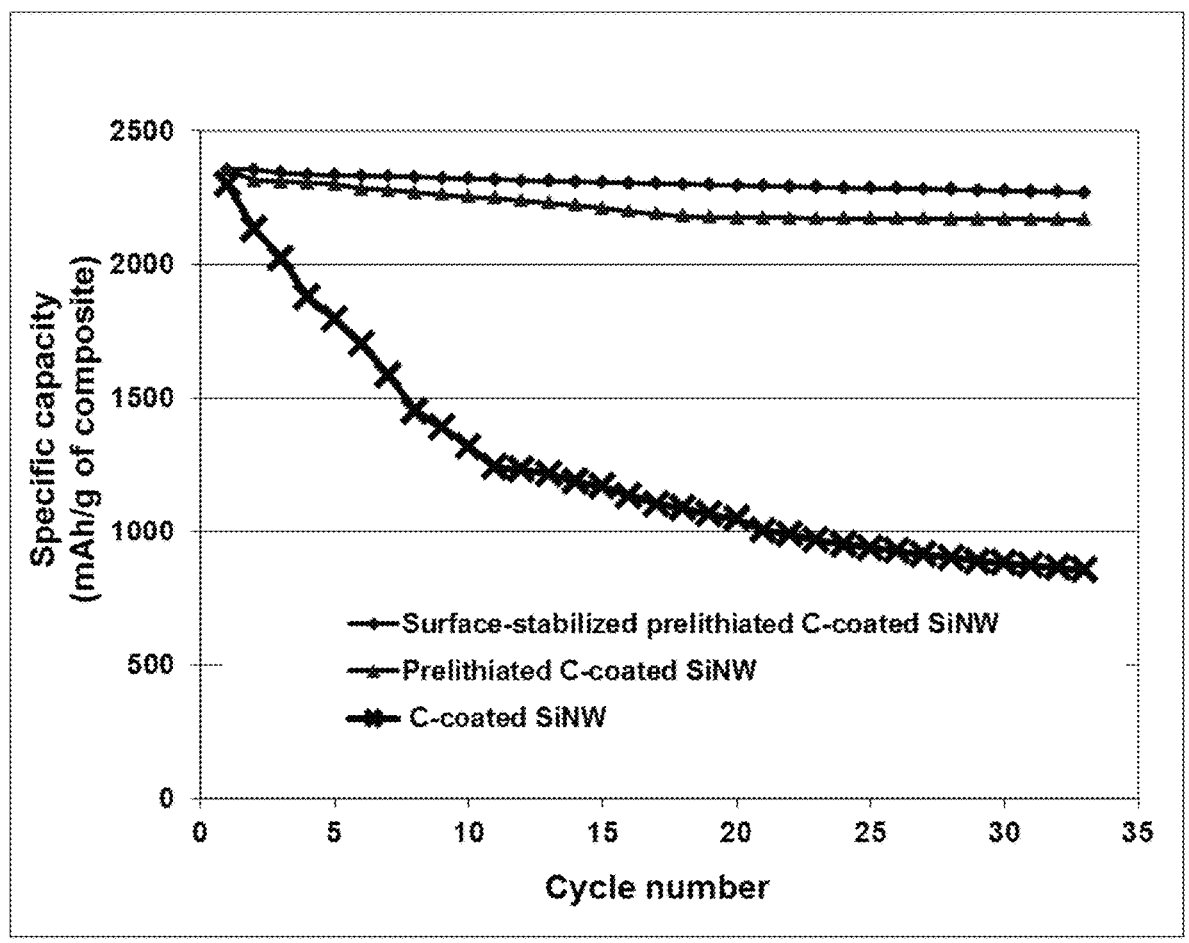
FIG. 5 Specific capacities of 3 lithium-ion cells having Si nanowires (SiNW) as an anode active material: carbon-coated SiNW, prelithiated carbon-coated SiNW, and surface-stabilized prelithiated carbon-coated SiNW, respectively.

FIG. 5 shows the specific capacities of the 3 lithium-ion cells having Si nanowires (SiNW) as an anode active material: carbon-coated SiNW (first cycle efficiency 92.8%), prelithiated carbon-coated SiNW (first cycle efficiency 98.3%), and surface-stabilized prelithiated carbon-coated SiNW (first cycle efficiency=99.96%), respectively. These data indicate that surface stabilization and prelithiation of C-coated Si nanowires provides the most stable cycling response. Carbon coating alone is not effective in improving cycling stability.

Example 5: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 1 below are the cycle life data of a broad array of batteries featuring presently invented elastomer-encapsulated anode active material particles vs. other types of anode active materials.

TABLE 1

Cycle life data of various lithium secondary (rechargeable) batteries.

| Sample ID | Protective means | Type & % of anode active material | Initial capacity (mAh/g) | Cycle life (No. of cycles) |
|---|---|---|---|---|
| Si-1 | Prelithiation + surface $Li_2O$ encapsulation | 25% by wt. C-coated Si nano particles (80 nm) + 67% graphite + 8% binder | 1,115 | 1,540-1,650 |
| Si-2 | Carbon coating only | 25% by wt. Si nano particles (80 nm) | 1,242 | 251 |
| SiNW-1 | LiF + $Li_2O$, further by Urea-Urethane encap. | 35% Si nanowires (diameter = 90 nm) | 1,258 | 2,533 |
| SiNW-2 | Encapsulation by (LiF + NaF) | 45% Si nano particles, pre-lithiated or non-prelithiated (no pre-Li) | 1,730 | 1,355 (pre-lithiated); 1,025 (no prelithiation) |
| $Co_3O_4$-1 | ($Li_2CO_3$ + $Li_2C_2O_4$) encapsulation | 85% $Co_3O_4$ + 8% graphite platelets + binder | 715 | 1,885 (Pre-lithiated); 1,266 (no pre-Li) |
| $Co_3O_4$-2 | No encapsulation | 85% $Co_3O_4$ + 8% graphite platelets + binder | 725 | 266 |
| $SnO_2$-1 | (LiOH + LiF) encapsulation | 75% $SnO_2$ particles (3 μm initial size) | 733 | 1,054 |
| $SnO_2$-2 | (LiOH + LiF) encapsulation | 75% $SnO_2$ particles (87 nm in diameter) | 732 | 3,245 (Pre-Li) |
| Ge-1 | $Li_2O$ encapsulation of C-coated Ge | 85% Ge + 8% graphite platelets + binder | 850 | 1,643 (Pre-Li) |
| Ge-2 | Carbon-coated | 85% Ge + 8% graphite platelets + binder | 856 | 120 |

The invention claimed is:

1. A process for producing prelithiated particles of an anode active material for a lithium battery, said process comprising:
    a) providing a lithiating chamber having at least one inlet and at least one outlet;
    b) feeding a plurality of particles of an anode active material, lithium metal particles, and an electrolyte solution containing a lithium salt dissolved in a liquid solvent, concurrently or sequentially, into said lithiating chamber through said at least one inlet to form a reacting mixture;
    c) moving said reacting mixture toward said at least one outlet at a rate sufficient for inserting a desired amount of lithium into said anode active material particles to form a slurry of prelithiated particles dispersed in said electrolyte solution; and
    d) discharging said slurry out of said lithiating chamber through said at least one outlet;
    wherein said process further comprises feeding a solution of a lithium salt or sodium salt dissolved in a liquid solvent into said lithiating chamber, before said slurry is discharged, to form a multi-component slurry, which is discharged from said lithiating chamber and introduced into an encapsulating device that encapsulates said prelithiated particles with a surface-stabilizing layer of lithium- or sodium-containing species.

2. The process of claim 1, wherein at least one of said prelithiated particles contains an amount of lithium from 1% to 100% of a maximum lithium content contained in said anode active material.

3. The process of claim 1, wherein said slurry is discharged into a receptor container.

4. The process of claim 1, further comprising a step of treating said discharged slurry for separating and recovering said prelithiated particles from said electrolyte solution.

5. The process of claim 1, wherein said lithiating chamber contains one or two rotating screws that drive the reacting mixture toward said at least one outlet.

6. The process of claim 1, wherein said step (b) of feeding, step (c) of moving, and step (d) of discharging are conducted in a continuous manner.

7. The process of claim 1, wherein said particles of anode active material are selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; and (g) combinations thereof.

8. The process of claim 1, wherein said anode active material comprises silicon and said prelithiated particles are selected from $Li_xSi$, wherein numerical x is from 0.01 to 4.4.

9. The process of claim 1, wherein said anode active material comprises silicon and said prelithiated particles comprise a prelithiated silicon $Li_xSi$, wherein numerical x is from 0.05 to 4.4.

10. The process of claim 1, wherein said anode active material comprises a doped semiconductor material selected from Si or Ge doped with n-type and/or p-type dopants.

11. The process of claim 1, wherein said anode active material particles are coated with a thin layer of carbon, graphene, electron-conducting polymer, or ion-conducting polymer having a thickness from 0.5 nm to 1 μm.

12. The process of claim 11, wherein said thin layer of carbon is obtained from pyrolization of a polymer, pitch, or organic precursor or obtained by chemical vapor deposition, physical vapor deposition, or sputtering.

13. The process of claim 1, wherein said anode active material particles are in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

14. The process of claim 1, wherein said anode active material particles contain a sub-micron or micron particle having a diameter or thickness from 100 nm to 30 μm.

15. A process for producing prelithiated particles of an anode active material for a lithium battery, said process comprising:
   a) providing a lithiating chamber having at least one inlet and at least one outlet;
   b) feeding a plurality of particles of an anode active material, lithium metal particles, and an electrolyte solution containing a lithium salt dissolved in a liquid solvent, concurrently or sequentially, into said lithiating chamber through said at least one inlet to form a reacting mixture;
   c) moving said reacting mixture toward said at least one outlet at a rate sufficient for inserting a desired amount of lithium into said anode active material particles to form a slurry of prelithiated particles dispersed in said electrolyte solution;
   d) feeding a solution of a lithium salt or sodium salt dissolved in a liquid solvent into said lithiating chamber to form a multi-component slurry; and
   e) said slurry is discharged from said lithiating chamber through at least one outlet and introduced into an encapsulating device that encapsulates said prelithiated particles with a surface-stabilizing layer of lithium- or sodium-containing species.

16. The process of claim 15, wherein said encapsulating device is selected from a spray dryer, a pan-coating device, an air-suspension coating device, a centrifugal extrusion device, or a vibration nozzle.

17. The process of claim 15, wherein said surface-stabilizing layer comprises a lithium- or sodium-containing species chemically bonded to said particles and said lithium- or sodium-containing species is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, $Li_4B$, $Na_4B$, $Na_2CO_3$, $Na_2O$, $Na_2C_2O_4$, NaOH, NaX, $ROCO_2Na$, HCONa, RONa, $(ROCO_2Na)_2$, $(CH_2OCO_2Na)_2$, $Na_2S$, $Na_xSO_y$, or a combination thereof, wherein X=F, Cl, I, or Br, R=a hydrocarbon group, $0<x\leq1$, and $1\leq y\leq4$.

18. A process for producing prelithiated particles of an anode active material for a lithium battery, said process comprising:
   e) providing a lithiating chamber having at least one inlet and at least one outlet;
   f) feeding a plurality of particles of an anode active material, lithium metal particles, and an electrolyte solution containing a lithium salt dissolved in a liquid solvent, concurrently or sequentially, into said lithiating chamber through said at least one inlet to form a reacting mixture;
   g) moving said reacting mixture toward said at least one outlet at a rate sufficient for inserting a desired amount of lithium into said anode active material particles to form a slurry of prelithiated particles dispersed in said electrolyte solution; and
   h) discharging said slurry out of said lithiating chamber through said at least one outlet;
   wherein said process further comprises feeding a solution of a polymer or monomer into said lithiating chamber to form a multi-component slurry, which is discharged from said lithiating chamber and introduced into an encapsulating device that encapsulates said prelithiated particles with a protective polymer layer.

19. The process of claim 18, wherein said encapsulating device is selected from a spray dryer, a pan-coating device, an air-suspension coating device, a centrifugal extrusion device, or a vibration nozzle.

20. The process of claim 18, wherein said protective polymer layer comprises a high-elasticity polymer encapsulating said prelithiated particles and wherein said high-elasticity polymer has a fully recoverable tensile strain from 5% to 700%, a thickness from 0.5 nm to 2 μm, and a lithium ion conductivity from $10^{-7}$ S/cm to $5\times10^{-2}$ S/cm at room temperature.

21. The process of claim 18, wherein said high-elasticity polymer has a fully recoverable tensile strain from 10% to 300%, a thickness from 1 nm to 0.5 μm, and a lithium ion conductivity from $10^{-6}$ S/cm to $5\times10^{-2}$ S/cm at room temperature.

22. The process of claim 18, wherein said high-elasticity polymer contains an elastomer selected from natural polyisoprene, synthetic polyisoprene, polybutadiene, chloroprene rubber, polychloroprene, butyl rubber, styrene-butadiene rubber, nitrile rubber, ethylene propylene rubber, ethylene propylene diene rubber, epichlorohydrin rubber, polyacrylic rubber, silicone rubber, fluorosilicone rubber, perfluoroelastomers, polyether block amides, chlorosulfonated polyethylene, ethylene-vinyl acetate, thermoplastic elastomer, protein resilin, protein elastin, ethylene oxide-epichlorohydrin copolymer, polyurethane, urethane-urea copolymer, or a combination thereof.

23. The process of claim 18, wherein said high-elasticity polymer contains an elastomer matrix composite containing a lithium ion-conducting additive dispersed in an elastomer matrix material, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, and $1\leq y\leq4$.

24. The process of claim 18, wherein said high-elasticity polymer contains an elastomer matrix composite containing a lithium ion-conducting additive dispersed in an elastomer matrix material, wherein said lithium ion-conducting additive contains a lithium salt selected from lithium perchlorate, $LiClO_4$, lithium hexafluorophosphate, $LiPF_6$, lithium borofluoride, $LiBF_4$, lithium hexafluoroarsenide, $LiAsF_6$, lithium trifluoro-metasulfonate, $LiCF_3SO_3$, bis-trifluoromethyl sulfonylimide lithium, $LiN(CF_3SO_2)_2$, lithium bis(oxalato)borate, LiBOB, lithium oxalyldifluoroborate, $LiBF_2C_2O_4$, lithium oxalyldifluoroborate, $LiBF_2C_2O_4$, lithium nitrate, $LiNO_3$, Li-Fluoroalkyl-Phosphates, $LiPF_3(CF_2CF_3)_3$, lithium bisperfluoro-ethysulfonylimide, LiBETI, lithium bis(trifluoromethanesulphonyl)imide, lithium bis(fluorosulphonyl)imide, lithium trifluoromethanesulfonimide, LiTFSI, an ionic liquid-based lithium salt, or a combination thereof.

25. The process of claim 18, wherein said high-elasticity polymer contains a mixture or blend of an elastomer and an electron-conducting polymer selected from polyaniline, polypyrrole, polythiophene, polyfuran, a bi-cyclic polymer, a sulfonated derivative thereof, or a combination thereof.

26. The process of claim 18, wherein said high-elasticity polymer contains a mixture or blend of an elastomer and a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

* * * * *